United States Patent
Hoogland

(10) Patent No.: US 7,387,698 B2
(45) Date of Patent: Jun. 17, 2008

(54) METHOD FOR APPLYING LABELS ON NON-CYLINDRICAL SURFACES

(75) Inventor: Hendricus Antonius Hoogland, Krommenie (NL)

(73) Assignee: I-Pac Patents B.V., LC Capelle aan den IJssel (NL)

( * ) Notice: Subject to any disclaimer, the term of this patent is extended or adjusted under 35 U.S.C. 154(b) by 0 days.

(21) Appl. No.: 10/495,060

(22) PCT Filed: Nov. 7, 2002

(86) PCT No.: PCT/NL02/00713

§ 371 (c)(1),
(2), (4) Date: Sep. 9, 2004

(87) PCT Pub. No.: WO03/039967

PCT Pub. Date: May 15, 2003

(65) Prior Publication Data

US 2005/0016659 A1    Jan. 27, 2005

(30) Foreign Application Priority Data

Nov. 7, 2001 (NL) .................................. 1019324

(51) Int. Cl.
*B32B 37/00* (2006.01)
(52) U.S. Cl. ...................... 156/196; 156/256; 156/475; 156/538; 156/556

(58) Field of Classification Search ............... 156/73.1, 156/242, 285, 538, 439, 556, 580, 580.1, 156/580.2, 583.1, 196, 199, 203, 256, 443, 156/475, 500, 539
See application file for complete search history.

(56) References Cited

U.S. PATENT DOCUMENTS

| | | | |
|---|---|---|---|
| 4,335,314 A | | 6/1982 | Geerk et al. |
| 4,359,314 A | | 11/1982 | Hellmer |
| 4,838,776 A | * | 6/1989 | Hasl ........................... 425/112 |
| 5,017,125 A | * | 5/1991 | Finnah ........................ 425/504 |
| 5,067,890 A | * | 11/1991 | Dunlap et al. ............... 425/504 |
| 5,198,247 A | * | 3/1993 | Bartimes et al. ............. 425/503 |

FOREIGN PATENT DOCUMENTS

EP    0 137 588 A1    4/1985

* cited by examiner

*Primary Examiner*—James Sells
(74) *Attorney, Agent, or Firm*—Hoffmann & Baron, LLP

(57) ABSTRACT

A method for labeling products, wherein a label is taken up from foil with the aid of engaging means, the engaging means comprising at least two parts moveable relative to each other, which parts engage the label at a distance from each other, whereupon said parts are moved relative to each other, such that the label is deformed, whereupon the label is transferred to a product of a mold cavity for manufacture of the product and is placed thereon or therein.

30 Claims, 5 Drawing Sheets

METHOD FOR APPLYING LABELS ON NON-CYLINDRICAL SURFACES

This application is the U.S. National Phase of International Application Number PCT/NL02/00713 filed on 7 Nov. 2002, which is incorporated herein by reference.

BACKGROUND OF THE INVENTION

The invention relates to a method for placing labels.

Usually, for finishing products, for example for embellishment, for improving product properties, for providing information or for enhancing the usability, labels are used which are either adhered onto a ready product, for instance in the form of stickers, or are laid in a mold cavity for in-mold-labeling.

When labeling products having singly curved or doubly curved surfaces, labeling is cumbersome. Often, the labels are cut and engaged by only a part, for instance a bottom part, and thereupon pressed into a mold cavity, such that parts which are to cover the walls of the product follow and come to lie against walls of the mold. This involves the danger of the label creasing or otherwise deforming undesirably.

The object of the invention is a method for applying labels with which products of three dimensional form can be provided with labels.

A further object of the invention is a method with which labels can be laid into a mold cavity in a simple manner for in-mold-labeling, while placing the labels is carried out in a controlled manner, for all parts thereof.

A still further object of the invention is a method with which labels can be provided in or on products, for instance by in-mold-labeling, while the label forms a substantially closed covering for at least a part of the product.

A further object of the invention is to provide a method with which, in a simple manner, different labels can be placed together into a mold cavity or onto a product, in particular such that a substantially continuous covering is obtained.

SUMMARY OF THE INVENTION

According to the invention, these and other objects are achieved with a method according to claim 1.

In a method according to the invention, a label is cut from a foil, in particular in a substantially flat condition, while the label is engaged by engaging means. The engaging means are designed such that they comprise at least two parts moveable relative to each other, which, after the label has been cut out, are moved relative to each other such that a desired shape of the label is obtained so that this can be applied onto a product of three dimensional shape or can be placed in a mold cavity suitable therefor. Preferably, the moveable parts are then moved such that with these, the label can be accurately placed.

With a method according to the invention, with the aid of the moveable parts, a label can in one go be brought into an eventual form and be released on a product or in a mold cavity, but it is also possible to apply different parts of the label sequentially, i.e., for instance, first a first part of the label is brought into the desired position and then the or each further part of the label, by successive movements of the parts of the engaging means. What can be prevented even better in this manner, is that undesired deformations occur, such as creases and the like.

In a method according to the present invention, two or more parts of the engaging means can be moved relative to each other such that a substantially tubular or conical label is obtained, for instance by pivoting a series of parts of the engaging means arranged next to each other. Also, a label can be formed having a slightly tray-shaped design, for instance, by pivoting parts of the engagement means which are arranged around a central part, for instance by pivoting these around axes including a mutual angle. It will be clear that engaging means can be used having moveable parts which are interconnected by, for instance, pivots, but that also engaging means can be used whose parts are separately arranged and are moveable.

In a further advantageous embodiment, in a method according to the invention, a series of labels are taken up and placed, together, while placement is carried out such that edges of the labels at least partly abut against each other or overlap each other for obtaining a continuous covering. According to the invention, when one label is used, it can be provided that, after placement, at least edge parts of the parts of this label overlap edge parts of other parts of the label, such that a virtually completely closed covering is obtained. It is then preferred that abutting and/or overlapping edge parts of the or each label are interconnected. In an advantageous embodiment, this is done before the label is placed, for instance by a heat treatment such as welding, more in particular ultrasonic welding. What is thus achieved in an even simpler manner is that a label can effect an at least substantially used covering, while, moreover, parts of the labels are prevented from still deforming, for instance during in-mold-labeling.

With a method according to the present invention, labeling of products can be effected by, for instance, in-mold-labeling, melting together of the label and a relatively warm product or by using adhesive means, such as for instance stickers or the like. Naturally, also other fastening methods are possible, for instance clamping and the like. Notably with in-mold-labeling techniques, a method according to the present invention is particularly advantageous since in this way, in a particularly simple and rapid manner, products having the desired properties can be manufactured, while, as a consequence of accurate placing of the labels, undesired deformations of the labels as a result of the introduction of the plastic for forming the in-mold-labeled products is prevented.

The invention further relates to an apparatus for providing labels on a product, characterized by the features of claim 12.

With such an apparatus, in a particularly simple and rapid manner, labels can be provided on products or in mold cavities, in a manner operated and controlled such that undesired deformations are prevented. With an apparatus according to the invention, labels can be brought into a desired form in a simple manner, for instance by bending the label, folding it or deforming it in a different manner.

It is preferred that with an apparatus according to the invention, engaging means are used which comprise reduced pressure means, in particular vacuum means. With these, in a particularly simple manner, a label can be engaged, also when it is relatively thin, without damage occurring, while the label can also be released in a simple manner. However, naturally, also other engaging means can be utilized.

With an apparatus according to the present invention, in an advantageous manner, the engaging means, at least the parts thereof which are moveable relative to each other, can be designed such that edge parts of the or each label can be placed so as to overlap, at least partly, edge parts of the same or a different label, for obtaining a closed covering.

The invention further relates to a product obtained with a method or apparatus according to the invention, in particular such product where edge parts of the or each label overlap other edge parts thereof at least partly, so that a virtually completely closed covering is obtained. It is then preferred that the product has at least substantially been obtained by in-mold-labeling utilizing an injection molding technique.

BRIEF DESCRIPTION OF THE DRAWINGS

In the further subclaims, further advantageous embodiments of a method and apparatus according to the invention are given. In clarification of the invention, exemplary embodiments of an apparatus and method according to the invention, as well as of products obtained therewith will be further described and elucidated with reference to the drawing. In the drawing.

DETAILED DESCRIPTION OF THE INVENTION

Figure 1:
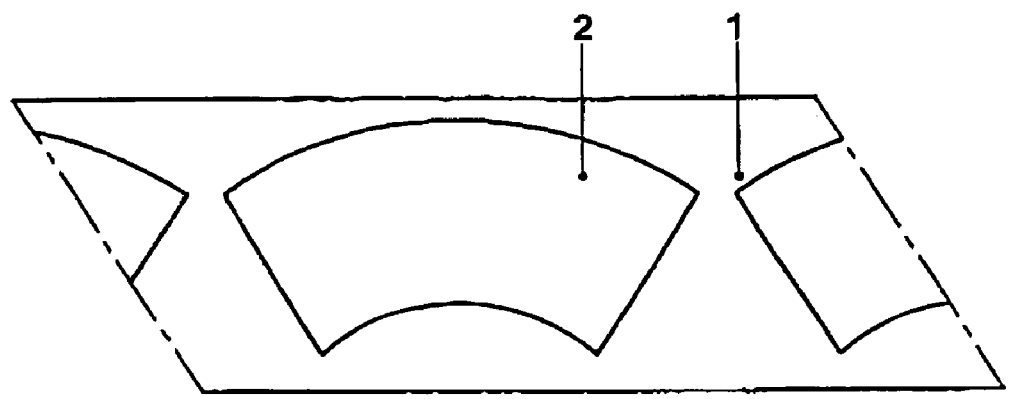
FIG. 1 shows a foil web with labels.

In this description, identical or corresponding parts have identical or corresponding reference numerals. The exemplary embodiments shown are only schematically represented, for the sake of illustration of the invention. The exemplary embodiments shown are all equipped with reduced pressure means, in particular vacuum means, for engaging the label. These means can for instance be designed as vacuum cups, strips with suction openings, suction mats, reduced-pressure mats or the like. However, it will be clear that different materials can be utilized too, for instance means with which foil can be taken up through charge differences, static charges and the like.

FIG. 1 shows a foil web 1 with labels 2 drawn therein, in the embodiment shown for instance suitable for labeling cup-shaped holders, which are slightly frustoconical. It will be clear that any suitable form can be used for a label. The thickness of the foil web 1 is, for instance, between several micrometers and several millimeters. Such labels are known, for instance, from in-mold-labeling techniques, sticker techniques, gluing and the like.

Figure 2:
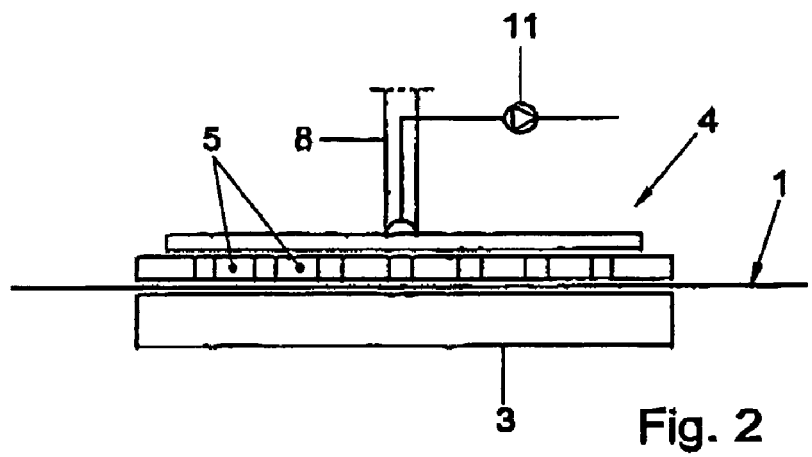
FIG. 2 shows, in schematic side view, an apparatus according to the invention.
Figure 3:
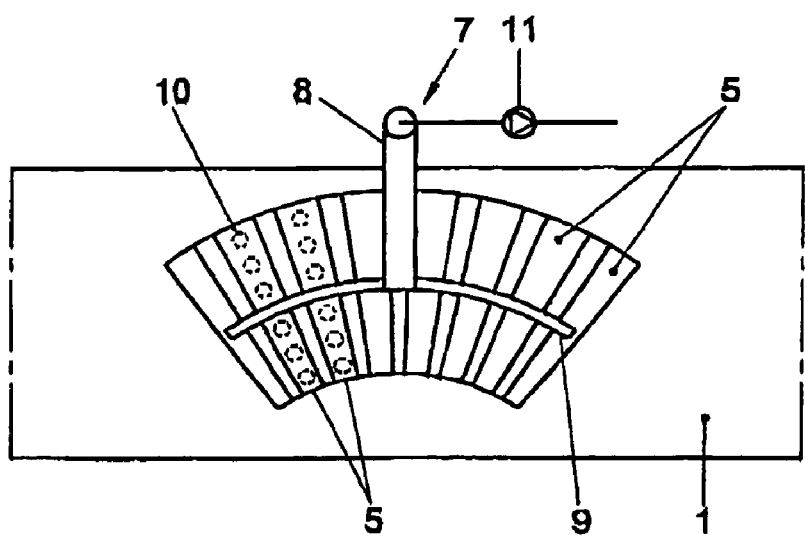
FIG. 3 shows, in top plan view, an apparatus according to FIG. 2.

In FIG. 2, the foil web 1 is shown from a side, received between a template 3 and a pick up device 4 for taking up the label 2 from the foil web 1, when this has been cut out with the cutting device 3. Such cutting devices are sufficiently well known from practice and will not be discussed further here. Any device suitable per se for cutting out labels can be used according to the invention. Although it is advantageous when the labels are cut from the foil web 1 immediately prior to use, they can, of course, also be cut out in a different position and, for instance, be supplied to the pick up device 4 in a stack to be processed according to the invention.

The embodiment of the pick up device 4 shown in the FIGS. 2-5 comprises a series of segments 5, which segments form parts of the pick up device 4 which are moveable relative to each other. The segments 5 can be interconnected by pivot bars 6, such as, for instance, shown in FIG. 5, but can also be interconnected in a different manner, for instance by flexible mats, piston cylinder assemblies as shown and to be further described in FIG. 6, or be individually supported by a supporting apparatus 7, with which the entire pick up device 4 can be displaced. In the embodiment discussed here, the supporting apparatus 7 is substantially formed by a supporting arm 8 to which the segments 5 are connected via a flexible cross bar 9 through which the vacuum means 10, schematically represented as circles and provided at the side of the segments 5 remote from the cross bar 9, are connected to a vacuum pump 11. Movement of the segments 5 is for instance obtained by suitable pneumatics. Such means are readily known to the skilled person and are not described further here. The cross bar 9 is sufficiently flexible to be bent into substantially a circle, thereby taking along the segments 5.

Figure 4:
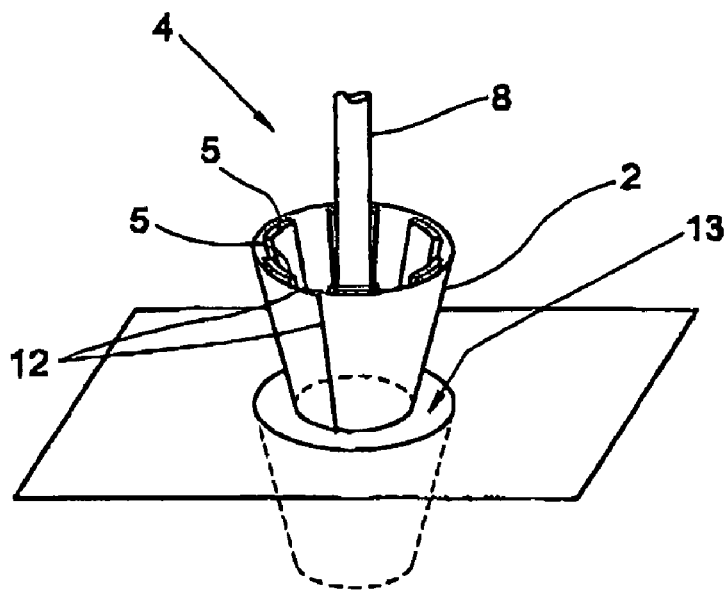
FIG. 4 schematically shows, in perspective side view, an apparatus according to the invention with label upon placement into a mold cavity.
Figure 5A:
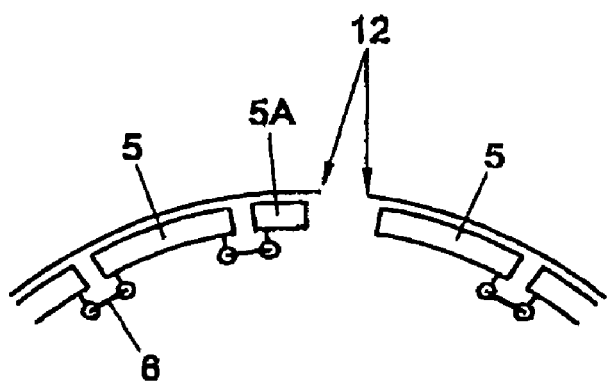
FIGS. 5A and B show a part of an apparatus according to FIGS. 2 and 3 in two steps during placement.
Figure 5B:
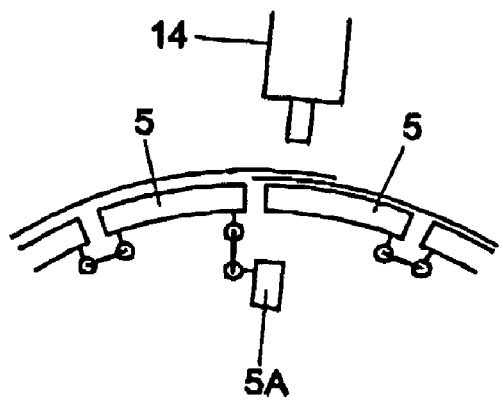

In the substantially flat position shown in FIG. 2, with the segments 5 located next to each other, the label 2 is engaged by the vacuum means 10 and thereupon taken from the foil web 1, whereupon the cross bar 9 with the segments 5 is bent into a slightly conical tube, whereby the segments 5 are displaced relative to each other such that they come to lie, somewhat as staves of a barrel, along the outer surface of the desired frustoconical form, thereby bending the label 2. As the label is retained by the segments 5, it is brought into the desired conical form, as schematically represented in FIG. 4. The longitudinal edges 12 of the label 2 can be laid against each other with a proper fit before the label 2 is brought into the mold cavity 18 by the pick up device 4, but the edges 12 can also slightly overlap, as schematically represented in FIGS. 5A and B. A segment 5A located along a first edge 12 is then pivoted away, whereupon the opposite edge 12 is laid thereagainst from the inside, as is represented in FIG. 5B. Optionally, the segment 5A can also be completely omitted. It is preferred that, then, the two longitudinal edges 12 are interconnected, for instance by ultrasonic welding with an apparatus 14 suitable to that end, schematically represented in FIG. 5B. However, it is also possible to leave the longitudinal edges clear for placement in that condition into the mold cavity 13 as shown in FIG. 4.

Figure 6:
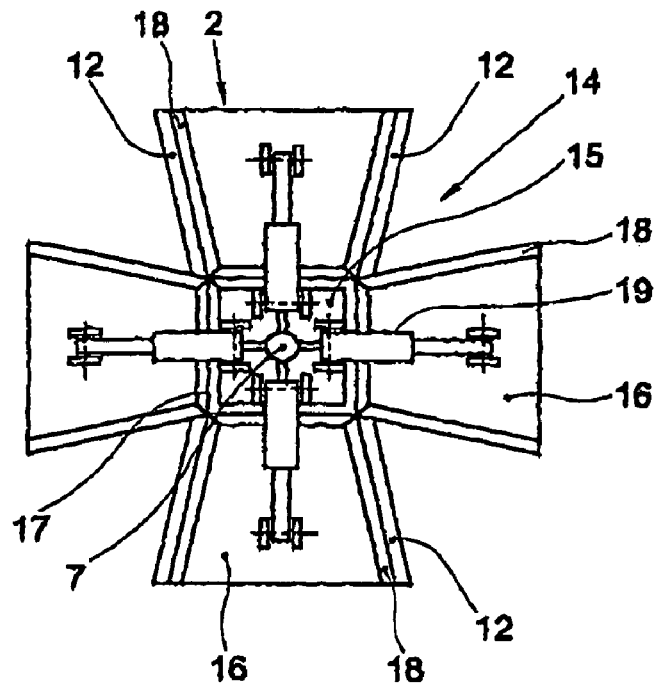
FIG. 6 schematically shows, in top plan view, an apparatus according to the invention in an alternative embodiment, with label.
Figure 7:
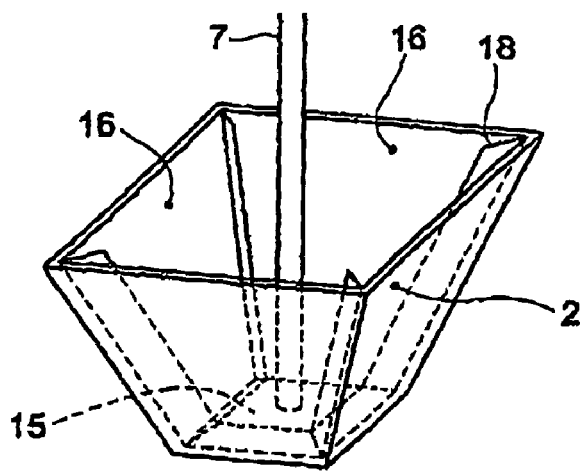
FIG. 7 schematically shows, in perspective view, an apparatus according to FIG. 6 with deformed label.

In FIG. 6, an alternative embodiment of a pick up device 4 according to the invention is shown, which has, substantially, the shape of a Maltese cross. This apparatus 4 comprises a bottom surface 15 and four tapered side faces 16, each connected to the bottom surface 15 via a pivot 17, at least a pivot mechanism such that the side faces 16 can be pivoted as moveable parts relative to the bottom surface 15, from the substantially flat position shown in FIG. 6 to the upstanding position shown in FIG. 7, vice versa. The bottom surface 15 and the side faces 16 are provided with chamfered edges 18, so that they fit together well without the label 2, retained by the side faces 16, being undesirably stretched upon pivoting. Via a piston cylinder assembly 19, each side face 16 is connected to the bottom face 15 such that when the piston rod of each assembly 19 is retracted, the side face 16 is moved upward from the plane of the drawing in FIG. 6 to a slightly inclined position, as shown in FIG. 7. At the side of each side face 16 remote from the piston cylinder assembly 19, and, optionally, the bottom face 15, earlier-mentioned vacuum means 10 (not shown) are provided, with which the label can be retained flat against the side face, so that when the side face is pivoted, it is carried along.

Figure 8:
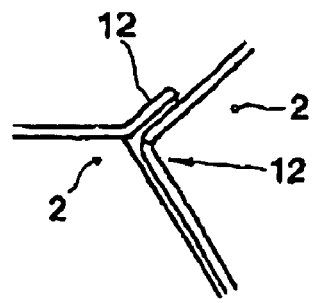
FIG. 8 schematically shows a corner of a label on an apparatus according to FIG. 7.

In the embodiment shown in FIG. 6, at two of the four side faces 16, the label 2 has longitudinal edges 12 projecting slightly outside the side face. Upon placement of the label 2, these longitudinal edges 12 can overlap the longitudinal edges of the parts of the label 2 engaged by the further two side faces 16 at the corresponding longitudinal edges 12, for instance as shown in FIG. 8. Then it is simply possible first to pivot upwards the side faces 16 where the longitudinal edges 12 of the label do not project outwards, thereupon the two further side faces, such that the longitudinal edges 12 cover the other two side faces at the outside. However, it is also possible to pivot the side faces 16 upwards in inverse order, so that the longitudinal edges 12, at least initially, will come to lie at the side of the other two side faces 16 remote from the label 2. Upon placement, it is then preferred first to press the side faces located, in FIG. 6, at the left and right hand side of the bottom face 15, against the walls of the mold cavity or the product cavity and to release the respective parts of the label 2, thereupon to move the side faces 16 back to an approximately vertical position and only then to move the further two faces against the side walls, so that the longitudinal edges 12 will come to lie at the inwardly directed side of the other two label parts. Again, the longitudinal edges 12 of the different parts can be interconnected as shown in FIG. 8, for instance by gluing, heating or the like, in particular by ultrasonic welding.

Figure 9:
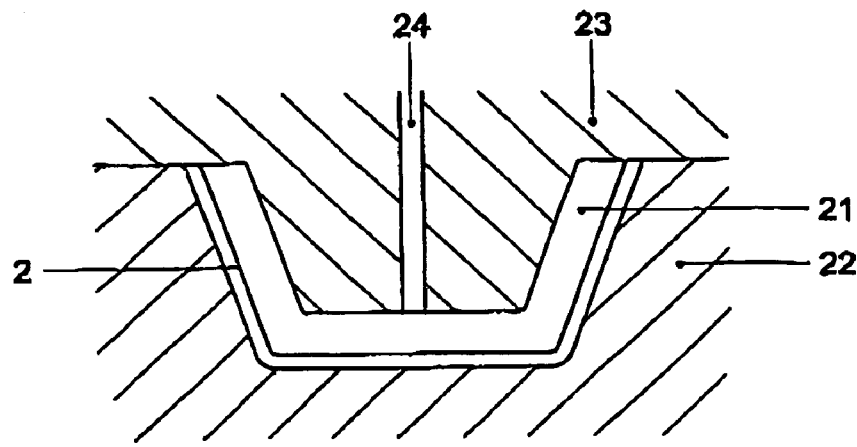
FIG. 9 shows, in cross sectional side view, a mold with mold cavity and a label placed therein.

FIG. 9 schematically shows, in cross sectional side view, a mold cavity 21, formed by a female part 22 and a male part 23, with a label 2 laid against the inside wall of the female part 22 of the mold cavity 21, whereupon, through a supply duct 24, plastic can be brought into the mold cavity 21 for in-mold labeling. Naturally, labels 2 can also be glued against products.

Figure 10:
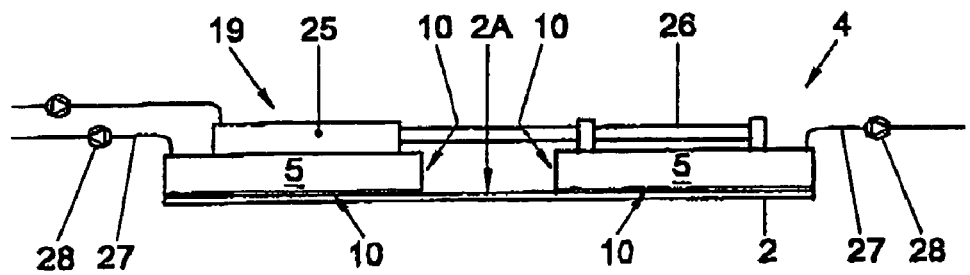
FIG. 10 schematically shows, in side view, a third embodiment of an apparatus according to the invention.
Figure 11:
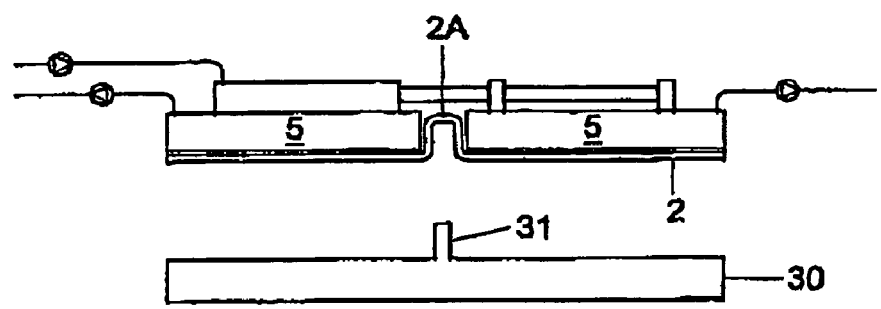
FIG. 11 shows the apparatus according to FIG. 10 during placement of a label.

In FIGS. 10 and 11, a further alternative embodiment is shown or placing a label 2 onto a product 30, in the embodiment shown for instance a plate with an upstanding rib 31. In this embodiment, the pick up device 4 comprises two engaging means or segments 5 displaceable relative to each other, interconnected by a piston cylinder assembly 19, whose cylinder is attached to a first segment, the piston rod 26 to the other segment 5. Again, the two segments 5 comprise vacuum means for engaging the label 2 at the side remote from the piston-cylinder assembly. The vacuum means 10 (not shown) are connected to vacuum ducts 27 with vacuum pumps 28.

In the position shown in FIG. 10, the segments 5 are moved apart and engage a flat label 2. Then, the segments 5 can be pulled towards each other by energizing the piston cylinder assembly 19, so that the part 2A of the label located between the segments 5 is slightly pleated. Optionally, at the sides of the segments 5 facing each other, vacuum means 10 can be provided, at least suction means for sucking label part 2A upwards. Then, the pick up device 4 with the thus pleated label can be moved over the product 30, such that the pleat 2A is laid over the rib 31 and can be fastened thereon, for instance by pulling the segments 5 further together. Naturally, in the same manner, a label can be laid in a mold cavity, while, moreover, the pleat 2A can also be forced in the opposite direction, for instance by blowing against it, so that instead of an upwardly directed pleat in FIG. 11, a downwardly directed pleat is obtained.

Figure 12:
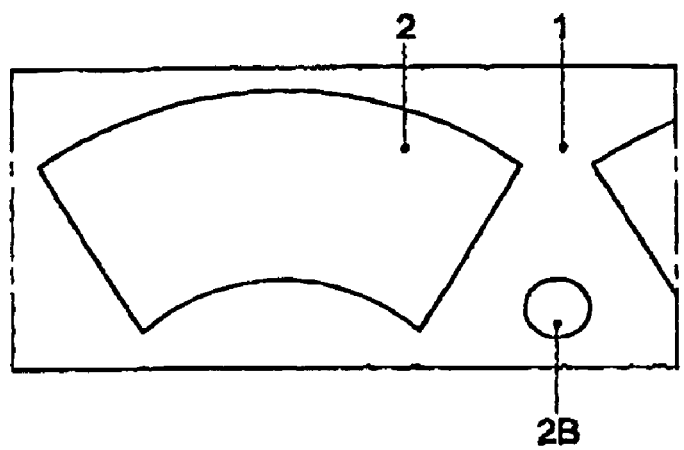
FIG. 12 shows a foil web with labels to be cut out for use in an apparatus according to FIG. 13.

FIG. 12 shows a foil web 1 having two types of labels 2, 2B therein. The first label 2 is comparable to the one shown in FIG. 1, for covering, for instance, a coffee cup or similar cone 40. The second label 2B is suitable for covering the bottom 41 of this cone 40. Such labels can be placed in the following manner.

Figure 13:
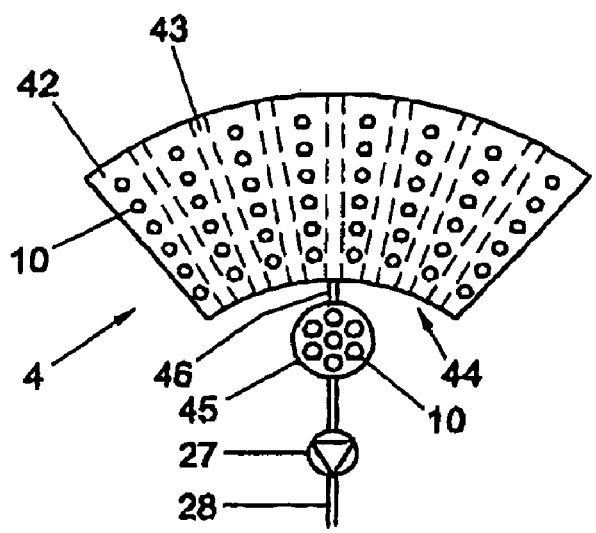
FIG. 13 shows a further embodiment of an apparatus according to the invention.
Figure 14:
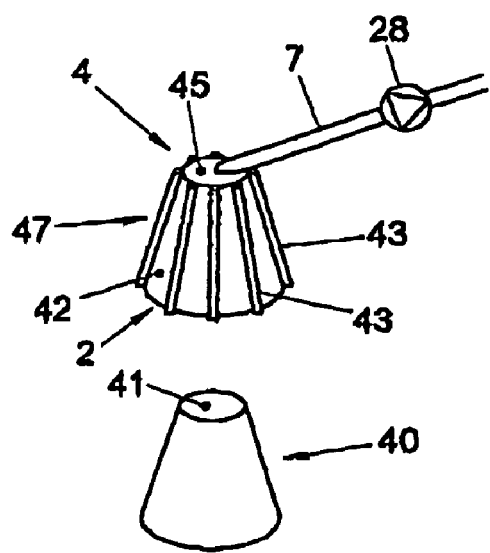
FIG. 14 shows the apparatus according to FIG. 13 during placement of a label over a product.

A pick up device 4 as shown in FIG. 13 comprises a substantially flexible first mat 42 provided with openings as vacuum means 10. Naturally, these can, again, be energized via a vacuum pipe 27 by a vacuum pump 28 or be designed in a different manner. The flexible mat 42 is borne by spokes 43 or like means, which, for that matter, can also form an integral part of the mat 42. Again, means are provided (not shown) for bending the flexible mat 42 into the slightly frustoconical shape shown in FIG. 14, for instance pneumatic means as described hereinabove. At the edge 44 of the first mat 42 facing downwards in FIG. 13, a circular second mat 45 is provided, again with vacuum means 10, which is connected via a pivot bar 46 to the first mat 42. Such a pick up device 4 can be used as follows.

With the first mat 42, with the aid of the vacuum means 10, the label 2 is taken up from the foil web 1, whereupon the pick up device 4 is slightly shifted and the second label 2B is engaged with the second mat 45. Then, the first mat 42 is brought in the above-mentioned conical shape, with the label turned inwards, whereupon, via the pivot means 46, the then formed cone 47 is pivoted relative to the second mat 45, so that a conical form is obtained, closed at the narrow side. Then, the pick up device 4 is shifted over the product 40, such that the label 2 and the second label 2B are fastened onto the longitudinal and the bottom surface 41, respectively, for instance by gluing, heating, ultrasonic welding or like techniques known per se, or slid thereon if the cone is, for instance, a male part of a mold.

It will be clear that with a method and apparatus according to the present invention, labels can be placed in a particularly simple manner both on the outside surface and on the inside surface of products, virtually independently of the materials and forms used. Variations of different parts of the exemplary embodiments described are emphatically understood to fall within the framework of the invention as outlined by the claims.

The invention is not limited in any way to the exemplary embodiments represented in the description and the exemplary embodiments. Many variations thereon are possible within the framework of the invention as outlined by the claims.

For instance, several labels can be taken up simultaneously or successively by one pick up device, while they can be placed on one and the same product or be brought into the same mold cavity. The labels may or may not link up with each other. In the embodiment shown in FIGS. 12-14, the label 2 and the second label 2B can already be cut out while being interconnected and be taken up as a whole by an apparatus according to FIG. 13. As a result, larger cutting losses may occur. It will be clear that also different embodiments of labels can be used for labeling different products. Labels that can be used, may be printed or be provided with a drawing, information or the like in a different manner. Also, specific labels can be used for obtaining barrier properties, such as thermal insulation, adjusted conductivity, reduced light sensitivity, scratch resistance or the like, but labels can also be used for decorative purposes, for instance for obtaining a different texture, coloring and the like. Each of the embodiments described can be used for both in-mold labeling and labeling ready products, both on the inside and on the outside, both convex and concave, angled and non-angled surfaces.

These and many comparable variations are understood to fall within the framework of the invention as outlined by the claims.

The invention claimed is:

1. A method for applying a label on a non-planar surface comprising the steps of:
    taking a label with a pick-up device, said pick-up device having a series of segments for engaging said label and a movement means interconnecting said segments;
    actuating said movement means whereby all of said segments move relative to each other so that said label is formed into a shape substantially conforming to said non-planar surface; and
    placing said pre-shaped label directly against said non-planar surface, wherein said movement means comprises a flexible cross-bar interconnecting said segments and said actuating step comprises the step of bending said cross-bar to displace all of said segments relative to each other to form a tubular or conical label.

2. A method for applying a label on a non-planar surface comprising the steps of:
    taking a label with a pick-up device, said pick-up device having a series of segments for engaging said label and a movement means interconnecting said segments;
    actuating said movement means whereby all of said segments move relative to each other so that said label is formed into a shape substantially conforming to said non-planar surface; and
    placing said pre-shaped label directly against said non-planar surface, wherein said movement means comprises a pivot mechanism interconnecting said segments and said actuating step comprises the step of pivoting all of said segments relative to each other to form a tray-shaped label.

3. An apparatus for applying a label on a non-planar surface comprising:
    a series of segments for engaging and taking the label from a web; and
    a movement means interconnecting said segments for moving all of said segments relative to each other so that said label is formed into a shape substantially conforming to said non-planar surface and for placing said pre-shaped label directly against the non-planar surface, wherein said movement means comprises a flexible cross-bar interconnecting said segments, said cross-bar being bendable to displace all of said segments relative to each other to form a tubular or conical label.

4. An apparatus for applying a label on a non-planar surface comprising:
    a series of segments for engaging and taking the label from a web; and
    a movement means interconnecting said segments for moving all of said segments relative to each other so that said label is formed into a shape substantially conforming to said non-planar surface and for placing said pre-shaped label directly against the non-planar surface, wherein said movement means comprises a pivot mechanism interconnecting said segments for pivoting all of said segments relative to each other to form a tray-shaped label.

5. A method according to claim 1, further comprising the step of cutting the label from a foil prior to taking up the label with the pick-up device.

6. A method according to claim 1, wherein said segments are moved toward each other to deform the label.

7. A method according to claim 2, further comprising the step of cutting the label from a web prior to taking up the label with said pick-up device.

8. A method according to claim 2, wherein all of said segments are moved toward each other to form said pre-shaped label.

9. A method according to claim 1, wherein at least two labels are cut out and are taken up with said pick-up device, while said labels are placed together or successively on a product or in a mold cavity, such that edges of the labels lie at least partly against or over each other.

10. A method according to claim 1, wherein the label is deformed such that at least one edge of at least one part of said label, after placement on a product or in a mold cavity, abuts against or lies on top of or under an edge of a different part of said label.

11. A method according to claim 10, wherein said edges are interconnected prior to or during placement of the label on a product or in a mold cavity.

12. A method according to claim 10, wherein said edges are interconnected by heat treatment.

13. A method according to claim 1, wherein the label is laid in a mold cavity for in-mold-labeling a product.

14. A method according to claim 1, wherein the label is brought into a product cavity and, in the product cavity, is fastened onto said product by partial melting.

15. A method according to claim 1, wherein the label is provided with adhesive means with which the label is fastened in or on a product.

16. A method according to claim 1, wherein the series of segments comprises a flexible mat with which at least a part of a label can be engaged by reduced pressure and/or charge differences, while said mat is deformed after engagement of the label for deforming the label.

17. An apparatus according to claim 3, wherein the series of segments comprises reduced-pressure means for engaging a label.

18. An apparatus according to claim 3, wherein the series of segments are designed for bending an engaged label.

19. An apparatus according to claim 4, wherein the series of segments are designed for folding an engaged label.

20. An apparatus according to claim 3, wherein the series of segments comprises rows of suction openings, while said segments each comprise at least one such row of openings, such that the label can be bent in at least one direction with the aid of the movement means.

21. An apparatus according to claim 3, wherein the series of segments are designed for engaging at least two labels, such that these, together, can be placed on a product or in a mold cavity.

22. An apparatus according to claim 3, wherein the series of segments are designed such that edge parts of parts of the label or the labels can be placed on a product or in a mold cavity so that they slightly overlap.

23. An apparatus according to claim 22, wherein means are provided for mutually connecting said overlapping edges prior to placement thereof on a product or in a mold cavity.

24. An apparatus according to claim 3, wherein a mold is provided, suitable for receiving the label, which mold is designed for in-mold-labeling through injection molding.

25. A method according to claim 2, wherein at least two labels are cut out and are taken up with said pick-up device, while said labels are placed together or successively on a product or in a mold cavity, such that edges of the labels lie at least partly against or over each other.

26. A method according to claim 2, wherein the label is deformed such that at least one edge of at least one part of said label, after placement on a product or in a mold cavity, abuts against or lies on top of or under an edge of a different part of said label.

27. A method according to claim 26, wherein said edges are interconnected prior to or during placement of the label on a product or in a mold cavity.

28. A method according to claim 26, wherein said edges are interconnected by heat treatment.

29. A method according to claim 2, wherein the label is laid in a mold cavity for in-mold-labeling a product.

30. A method according to claim 2, wherein the label is brought into a product cavity and, in the product cavity, is fastened onto said product by partial melting.

* * * * *